(12) United States Patent
Harms et al.

(10) Patent No.: US 6,175,362 B1
(45) Date of Patent: Jan. 16, 2001

(54) TV GRAPHICAL USER INTERFACE PROVIDING SELECTION AMONG VARIOUS LISTS OF TV CHANNELS

(75) Inventors: Kevin Harms, San Jose; Alfred Leung; Dimitry Nasledov, both of Sunnyvale; Michael Deacon, San Jose, all of CA (US)

(73) Assignee: Samsung Electronics Co., Ltd., Seoul (KR)

( * ) Notice: Under 35 U.S.C. 154(b), the term of this patent shall be extended for 0 days.

(21) Appl. No.: 08/897,827

(22) Filed: Jul. 21, 1997

Related U.S. Application Data

(60) Provisional application No. 60/023,904, filed on Aug. 14, 1996.

(51) Int. Cl.[7] .................................................. H04N 5/44
(52) U.S. Cl. ........................ 345/327; 348/563; 348/906; 348/12
(58) Field of Search ................. 348/7, 12, 563, 348/906, 10, 6, 13; 455/5.1, 21.2, 6.2; 345/327

(56) References Cited

U.S. PATENT DOCUMENTS

| | | | |
|---|---|---|---|
| 5,353,121 | * | 10/1994 | Young et al. .......................... 348/563 |
| 5,619,249 | * | 4/1997 | Billock et al. ....................... 348/563 |
| 5,623,613 | * | 4/1997 | Rowe et al. .......................... 395/353 |
| 5,629,733 | * | 5/1997 | Youman et al. .......................... 348/7 |
| 5,635,989 | * | 6/1997 | Rothmuller ........................... 348/563 |
| 5,694,176 | * | 12/1997 | Bruette et al. ....................... 348/906 |
| 5,694,562 | * | 12/1997 | Fisher .................................. 395/349 |
| 5,731,844 | * | 3/1998 | Rauch et al. .......................... 348/564 |
| 5,785,257 | * | 7/1998 | Herz et al. ............................ 348/906 |
| 5,793,438 | * | 8/1998 | Bedard ................................. 348/906 |
| 5,880,768 | * | 3/1999 | Lemmons et al. ..................... 455/6.2 |

* cited by examiner

*Primary Examiner*—Andrew I. Faile
*Assistant Examiner*—Reuben M. Brown
(74) *Attorney, Agent, or Firm*—Kenneth L. Sherman, Esq.; Sherman & Sherman; Jeffrey P. Aiello

(57) ABSTRACT

A TV graphical user interface (GUI) in a satellite TV system enables users to create customized lists of TV channels. Everyday, favorite and theme lists may be generated to respectively combine TV channels being watched regularly, favorite TV channels and channels relating to particular subjects. An oval list name object is arranged on a screen to indicate the name of the currently selected list of TV channels. The users may click on the list name object to make their selection among various TV channel lists available in the TV system. In a channel changer mode, the TV GUI displays a graphical channel changer composed of channel boxes that show numbers and logos of TV channels in the currently selected list. To switch the TV set to a required TV channel, the user clicks on the graphical channel box that indicates the required channel. In a program guide mode, a list of TV programs may be provided based on the channel changer. Vertical program bars that display TV programs are aligned with the channel boxes indicating TV channels that carry the corresponding TV programs. To identify various TV channel lists available in the TV system, the oval list name object, as well as the channel boxes and program bars, are displayed in a color that represents a selected TV channel list.

19 Claims, 9 Drawing Sheets

| CLUT location | Red byte | Green Byte | Blue Byte | Output Color |
|---|---|---|---|---|
| S0 | S0 | S0 | S0 | Black |
| S1 | Sff | S0 | S0 | Full Red |
| S2 | S80 | S0 | S0 | Half Red |
| S3 | S40 | S0 | S0 | Dim Red |
| S4 | Sff | Sff | Sff | White |
| S5 | S80 | S80 | S80 | Med. gray |
| S6 | S00 | Sff | S00 | Full Green |
| S7 | S00 | S00 | Sff | Full Blue |
| S8 | S00 | Sff | Sff | Cyan |
| etc | etc | etc | etc | etc |

FIG. 3

TV GRAPHICAL USER INTERFACE PROVIDING SELECTION AMONG VARIOUS LISTS OF TV CHANNELS

This application claims the benefit of U.S. Provisional Application No. 60/023,904 filed Aug 14, 1996.

TECHNICAL FIELD

The present invention relates to television (TV) systems, and in particular, to a novel TV graphical user interface (GUI) that facilitates user access to various preselected lists of TV channels.

1. Background Art

The growing availability of TV broadcast and interactive services creates a need for a new type of a TV control system that would facilitate user access to options offered by TV program providers. For example, direct broadcast satellite services require users to make their selection among about a thousand TV channels with various TV programs and services. Direct television satellite broadcasting is provided via direct broadcast satellites at an uplink frequency of 17.3 to 17.9 GHz and a downlink frequency of 12.2 to 12.7 Ghz.

A digital satellite television system for direct television broadcasting includes a transmitter for transmitting television signals including video and audio components to a satellite. The satellite retransmits the received television signals to an outdoor antenna assembly that includes a dish-like antenna and a block converter. The dish-like antenna directs the received television signals to the block converter that converts the frequencies of the received television signals to respective lower frequencies.

The television signals produced by the block converter are connected via a coaxial cable to an indoor satellite receiver coupled to a TV set. The satellite receiver tunes, demodulates and otherwise processes the received television signals to provide video and audio signals with a NTSC, PAL or SECAM format suitable for processing by the TV set that produces an image on a display screen in response to the video signals, and an audible response by means of speakers in response to the audio signals.

Within the transmitter, analog video and audio signals are converted to respective digital signals compressed according to the Motion Picture Expert Group (MPEG) encoding standard. The resultant digital signals are represented by a stream of packets including error correction data. The type of packets is identified by a header code. Packets corresponding to control data may also be added to the packet stream.

In the MPEG standard, the video information may be transmitted in the form of a luminance (Y) component and two color difference (U and V) components. For example, the first color difference component may represent the difference between the red image information and the luminance image information (R-Y), and the second color difference component may represent the difference between the blue image information and the luminance image information (B-Y). In addition, the color information is compressed because the two color difference components correspond to more than one picture element. The use of color difference components and the sharing of the color difference components between picture elements reduces the transmission bandwidth.

The digital information resulting from the compression and error correction encoding is modulated on a carrier using Quaternary Phase Shift Keying (QPSK) modulation and transmitted to a satellite for retransmission.

The satellite receiver comprises a tuner for selecting the appropriate carrier signal retransmitted by the satellite and for converting the frequency of the selected carrier to an intermediate frequency (IF) signal. A QPSK demodulator demodulates the IF signal and supplies it to an error-correcting decoder to correct demodulated packets representing video and audio information. An MPEG decoder decodes and decompresses video and audio packets to form digital video and audio signals supplied to a TV set. A TV set-top box serves to deliver compressed digital video and audio signals in real time usable form to one or more TV sets.

A TV program guide presenting a list of available TV programs and services may be displayed on a TV screen to facilitate user access to TV programs and services. As the digital satellite television system may provide about 1,000 TV channels with various TV programs and services, it would be convenient to create a customized list of programming with a reduced number of channels. For example, an "everyday", "favorite", or "theme" list may be built. The everyday list would include TV channels that the user wants to watch every day. The favorite list would contain favorite TV channels. The theme list may combine TV channels relating to a specific theme, for example, movie channels or sport channels.

In a conventional TV GUI, substantial time and efforts are required to switch from the currently viewed list of TV channels to a desired customized channel list. For example, a user may be required to make several selections among options provided by intermediate menus.

It would be desirable to provide a TV GUI that facilitate user access to various customized lists of TV channels.

Also, it would be desirable to provide visual indication that enables the user to recognize the currently displayed list of TV channels.

2. Disclosure of the Invention

Accordingly, one advantage of the present application is in providing a TV graphical user interface (GUI) that facilitates user access to various customized lists of TV channels.

Another advantage of the present application is in providing visual indication that enables a user to recognize the currently displayed list of TV channels.

The above and other advantages of the invention are achieved, at least in part, by providing a television system that comprises a CPU, and a TV monitor controlled by the CPU for displaying a graphical user interface. A graphical channel changer on a TV screen includes channel objects that represent TV channels of a TV channel list selected among a plurality of TV channel lists preprogrammed by a user. A list name object is arranged on the screen to switch the channel changer from a first TV channel list to a second TV channel list when the user activates a pointing device directed at the list name object.

In accordance with a first aspect of the invention, the list name object shows a name of a TV channel list currently represented by the channel changer.

In accordance with another aspect of the invention, the list name object, as well as the channel objects, may be identified by a first color when the channel changer represents the first TV channel list, and by a second color when the channel changer represents the second TV channel list.

In accordance with a further aspect of the invention, the GUI may include an electronic TV program guide that contains a TV program schedule for a predetermined time period for TV channels of the currently selected TV channel list. The electronic program guide switches from a first TV program schedule for the first TV channel list to a second TV program schedule for the second TV channel list when the user activates a pointing device directed at the list name object.

The electronic TV program guide may comprise program bars aligned with the channel objects for indicating TV programs carried by TV channels of the currently selected TV channel list. The vertical program bars may be identified by the first color when the program guide represents the first TV program schedule, and by the second color when the program guide represents the second TV program schedule.

In accordance with another aspect of the invention, the channel changer may switch from the second TV channel list to a third TV channel list when the user activates the pointing device directed at the list name object representing the second TV channel list. Also, the electronic program guide may switch from the second TV program schedule for the second TV channel list to a third TV program schedule for the third TV channel list when the user activates the pointing device directed at the list name object representing the second TV channel list.

In accordance with a further aspect of the invention, the list name object, as well as the channel objects and vertical program bars, may be identified by a third color when the channel changer represents the third TV channel list.

In accordance with a method of the present invention, the following steps are carried out for selecting customized lists of TV channels:

checking a position of a cursor moved by a pointing device, detecting when the cursor is positioned over the list name object, and redrawing the channel objects to indicate TV channels in a next list of a preset sequence of TV channel lists when the pointing device is activated.

In accordance with another aspect of the invention, a TV monitor is controlled by a CPU for displaying lists of TV channels. A TV channel list name indicator is provided on a screen for enabling a user to switch from a first list of TV channels to a second list of TV channels when a pointing device directed at the TV channel list name indicator is activated once, and for enabling the user to switch from the first list of TV channels to a third list of TV channels when the pointing device directed at the TV channel list name indicator is activated twice.

Still other objects and advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

FIG. 3 illustrates contents of a color look up table.

BEST MODE FOR CARRYING OUT THE INVENTION

The best mode for practicing the invention is based on the realization of a satellite receiver in a digital satellite television system. However, it is to be understood that the present invention is applicable to any system for receiving TV signals.

Figure 1:
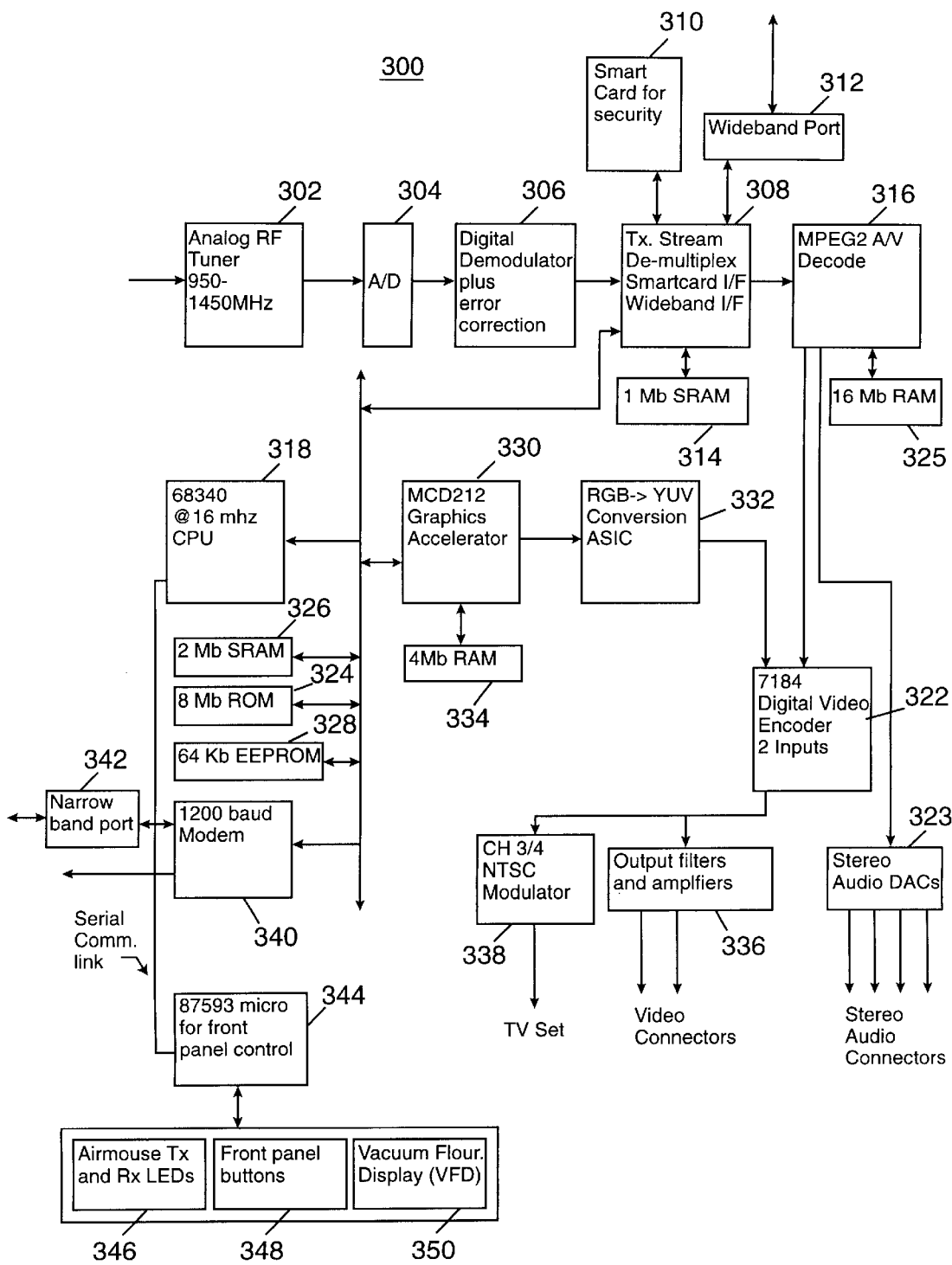
FIG. 1 is a block diagram of a satellite receiver of the present invention.

Reference is now made to FIG. 1 of the drawings wherein an indoor satellite receiver 300 includes an analog radio-frequency (RF) tuner 302 such as a satellite front end demodulator manufactured by Sharp/Comstream. The RF tuner 302 is coupled via an external UHF/VHF to an outdoor unit that receives incoming television signals from a satellite. The outdoor unit may comprise a 18" antenna made of aluminum and dual low noise block converters that convert satellite signals in a frequency range from 12.2–12.7 GHz received by the antenna into the 950–1450 Mhz frequency range signals.

The RF tuner 302 equipped with a local oscillator and mixer selects the appropriate carrier signal corresponding to a selected satellite TV channel from the 950–1450 Mhz signals received from the outdoor unit. The frequency of the selected carrier is converted to an intermediate frequency (IF) signal fed to an analog-digital converter 304 that produces a digital IF signal.

A digital demodulator 306 performs QPSK demodulation of the digital IF signal and carries out multiple error correction algorithms required to decode error correction data contained in the received signal. For example, Viterbi and Reed-Solomon error correction algorithms may be employed. A single ASIC manufactured by Comstream may be used as the digital demodulator 306.

The decoded digital signal is fed to a transport chip 308 responsible for demultiplexing video, audio and data signals. The transport unit 308 is also connected to a card 310 for providing conditional access to the satellite receiver 300. The card 310, such as a Smart Card manufactured by the News Data Corporation, controls access to paid channels and services using the Data Encryption Standard (DES).

Wideband data are fed to the transport unit 308 via a wideband port 312 that provides compatibility with 16:9 wide NTSC format. The wideband port is also controlled by the conditional access system. A buffer 314 is used to support the transport chip operations. A 128K×8 static random-access memory (SRAM) with access speed of 70 ns may be used as the buffer 314.

The transport chip 308 routes the video and audio signals to an MPEG decoder 316, while data is made available to a CPU 318. The MPEG decoder 316 provides decompression of the video and audio signals in accordance with the MPEG standard. For example, a single-chip STi3520 MPEG decoder may be used. By way of example, reference is made to U.S. Pat. No. 5,198,901 to Lynch of Mar. 30, 1993; to U.S. Pat. No. 5,293,229 to Iu of Mar. 8, 1994; to U.S. Pat. No. 5,311,310 to Jozawa et al. of May 10, 1994; to U.S. Pat. No. 5,361,105 to Iu of Nov. 1, 1994; to U.S. Pat. No. 5,386,234 to Veltman et al. of Jan. 31, 1995; and to U.S. Pat. No. 5,400,076 to Iwamura of Mar. 21, 1995. Those disclosures and citations referenced therein may be consulted for an understanding of the specific details of conventional MPEG decompression arrangements.

The MPEG decoder 316 of the preferred embodiment is supported by a synchronous RAM 320 formed by four 256K×16 DRAMs with access speed of 70 ns capable of holding 3 full frames of MPEG video and audio data, and control information.

Decompressed video data in YUV format is fed to a digital video encoder 322. The decompressed audio data is supplied to the video encoder 322, and to a stereo audio digital-to-analog converter (DAC) 323 for converting digital audio signals into analog form. A single-chip AK4319 DAC, manufactured by Asahi Kasei, may be used as the DAC 323.

Operations of the satellite receiver 300 are supported by the CPU 318 such as a Motorola 68340 CPU chip running at 16 MHz. An external watch crystal is used to derive the 16 MHz internal clock. The CPU 318 may have a 16-bit external data bus and a 32-bit data bus for internal operations. The CPU 318 may run the PSOS+operating system developed by Integrated Systems Inc.

The CPU 318 is supported by a ROM 324, a SRAM 326 and an EEPROM 328. The ROM 324 that holds the PSOS+ operating system, menus, fonts, and other fixed data may be formed by two 4 Mbit masked ROM chips organized as 512K×8 with access speed of 95 ns.

The SRAM 326 formed, for example, by two 1 Mbit SRAM chips organized as 128K×8 with access speed of 70 ns, may be used for storing all active data such as system stacks, variables, menu data, etc. The ROM 324 and SRAM 326 may operate at a zero wait state to provide maximum performance.

The EEPROM 328, for example, a single 8K×8 EEPROM chip with access speed of 150 ns, may store non-volatile data such as user preferences.

To enhance the graphics presentation capabilities of the satellite receiver 300, a graphics accelerator 330, such as a MCD212 graphics accelerator manufactured by Motorola, is used as a co-processor. The graphics accelerator 330 allows the receiver 300 to increase the rate of screen updates and to provide up to 256 colors in a graphics image. Also, the accelerator provides graphical effects such as wipes, dissolves, fades, etc. during transitions of menus on a TV screen, and supports operations of a remote pointing device such as an Airmouse®. This type of remote pointing device is manufactured by Seletech and Airmouse Remote Controls. The output of the graphics accelerator 330 produced in RGB format is fed to a converting circuit 332 for conversion into YUV format.

The graphics accelerator 330 may be supported by a synchronous 4 Mbit RAM 334 provided, for example, on a single 256K×16 DRAM chip with access speed of 70 ns. The RAM 334 used for storing graphics data is capable of storing two graphics planes with 720×480 pixel resolution. The graphics accelerator 330 allows two graphics planes to be combined to produce various graphical effects.

The graphics data from the conversion circuit 332, and decompressed video and audio data from the MPEG decoder 316, are supplied to separate inputs of the digital video encoder 322 such as a single-chip Phillips 7184 encoder. The video encoder 322 is responsible for encoding digital video, audio and graphics data to produce a combined composite signal in NTSC format. For example, U.S. Pat. No. 5,489,947 to Cooper of Feb. 6, 1996, incorporated herewith by reference, discloses an on-screen display (OSD) arrangement that allows the graphics data to be displayed on a TV set screen together with the image represented by the received video signals, or in place of this image. A single control bit may be used by the video encoder 322 to switch its output from graphics data to video and back.

The video encoder 322 also produces baseband video and audio signals. The baseband video signals are buffered by a pair of video operational amplifiers 336 coupled to video connectors. The baseband audio signals are fed to the stereo audio DAC 323 for converting to analog format and supplying to audio connectors. The video and audio connectors may be coupled to such external devices as stereo receivers, TVs or VCRs.

The combined composite signal from the video encoder 322 may be fed to a NTSC modulator 338 that modulates the composite signal to either channel 3 or 4 of a TV set coupled to the modulator 338. The modulator 338 also allows the combined composite signal to bypass a cable/antenna input of the TV set. Operations carried out to display video and graphical images on the TV set screen will be described in more detail later.

The TV set coupled to the satellite receiver 300 may display graphics data representing a graphical user interface (GUI) that allows a user to control operations of the satellite receiver 300, and provides user access to services and options offered by the digital satellite TV system. For example, graphics on the TV set screen may represent a graphical channel changer that enables a user to select TV channels. Another example of a graphical presentation on the TV screen is an electronic program guide that contains names of TV programs arranged in a 2-dimensional array, in which TV channels are listed vertically, and the time of broadcasting is listed in the horizontal direction. Various aspects of the GUI including the graphical channel changer and the electronic program guide are discussed in more detail later.

A modem 340, such as a single-chip SSI 1200-baud modem, is provided to support communications via a narrowband port 342 used for low bandwidth signal transmission, or via a telephone jack connected to a telephone line. For example, the modem 340 may support remote billing and interactive services.

A microcontroller 344 such as a Phillips 87593 microcontroller provides control of receiver functions relating to control, interface and display devices arranged at the front panel of the satellite receiver 300. Among such devices are a pointing device interface 346, front panel controls 348, and a vacuum fluorescent display (VFD) 350.

The pointing device interface 346 enables a remote optical pointing device such as an Airmouse® to provide a wireless control of the satellite receiver 300. By way of example, reference is made to U.S. Pat. No. 5,045,843 to Hansen of Sep. 3, 1991, and U.S. Pat. No. 5,359,348 to Pilcher et al. of Oct. 25, 1994 for descriptions of Airmouse® arrangements and operation. For example, the pointing device interface 346 may comprise an infrared (IR) transmitter and receiver that provide infrared communications with a pointing device located up to 7 meters away from the receiver 300 at an angle of up to 45 degrees. This type of remote pointing device has been used principally for moving the cursor of a personal computer.

The Airmouse® type pointing device in accordance with the invention points directly at a TV set screen to provide direct interactions between the user hand that holds the pointing device, and the TV screen. The pointing device may comprise a cursor control circuit that moves a cursor on the TV screen in response to the position of the pointing device with respect to, for example, the IR transmitter at the front panel of the receiver. The pointing device interface 346 supports the GUI by providing and controlling the RF tuner 302 of the satellite receiver to respond to random, instant user access to any point on the TV screen. Selections are made by clicking one of the buttons on the pointing device. For example, at any time when there are no graphics on the screen, a click brings up graphical objects used in a channel changer mode. Interactions between the GUI and remote pointing device are disclosed in more detail in our copending application Ser. No. 08/720,501, entitled "TELEVISION GRAPHICAL USER INTERFACE EMPLOYING REMOTE RANDOM ACCESS POINTING DEVICE," filed concurrently herewith and incorporated by reference.

In addition to the optical pointing device, a remote hand held control unit of the satellite receiver 300 may also include several dedicated buttons to provide, for example, switching power ON and OFF, channel and volume control, selection between regular TV broadcasting and satellite broadcasting, etc.

The front panel control 348 provides control of the GUI in the event that the remote pointing device is missing or non-operable. The controls 348 may include a TV/Satellite receiver key for switching between regular TV broadcasting and satellite broadcasting. Set-up, menu, clear, select or "click" keys may be provided to control modes of operation. Cursor keys may be arranged to move the cursor on the TV screen in various directions.

The VFD 350 is provided to show current TV channel number and time. Also, the VFD 350 may indicate current incoming signal strength and other operational information.

Figure 2:
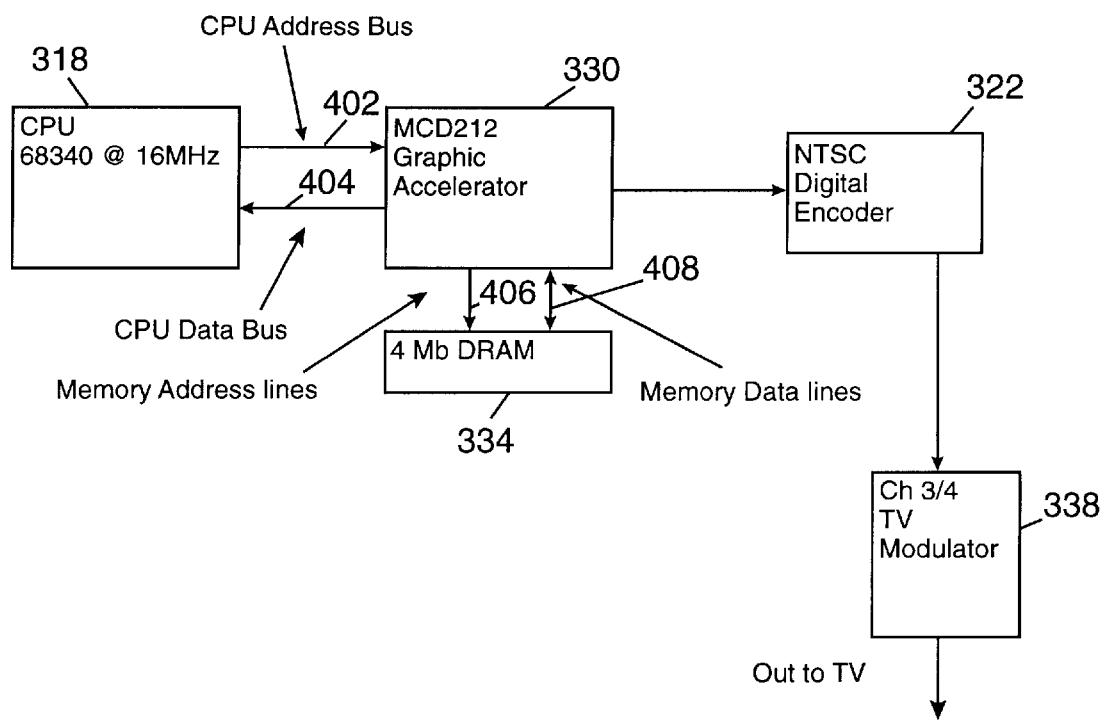
FIG. 2 is a block diagram illustrating a graphical object drawing procedure.

Reference is now made to FIG. 2 that illustrates drawing color graphic objects on a TV screen according to the present invention. As discussed above, the CPU 318 interacts with the graphics accelerator 330 used as a co-processor to enhance the graphics capability of the satellite receiver 300. The CPU 318 may be coupled to the graphics accelerator 330 via an external 24-bit address bus 402 and a 16-bit data bus 404. The 24-bit address bus 402 enables the CPU 318 to address up to 16 Mbytes of a graphics memory. This storage capacity corresponds to an address space from 000000 to ffffff in hexadecimal notation. Various graphics memory arrangements may be organized in this address space, as long as each memory location is uniquely addressable. For example, the capacity of the graphics memory 334 may be equal to 4 Mbit or 512 Kbytes. Assuming that the graphics memory address space corresponds to the middle part of the system memory map, the $800000 hex address may be selected as the lowest graphics memory location, and the $87ffff hex address may be designated as the top graphics memory address. The graphics memory 334 may be coupled to the graphics accelerator 330 via memory address lines 406 and memory data lines 408.

The graphics accelerator 330 enables a TV set to display up to 16 million different colors. However, only 256 different colors can be displayed on any one screen at any given time. As a result, each unique pixel displayable on a TV screen can be represented by a single 8-bit value. Thus, each pixel stored in the 512 Kbyte graphics memory 334 is represented by a single 8-bit value or byte.

Each graphics plane stored in the graphics memory 334 is provided by a rectangular array of 720×480 pixels representing a picture on the TV screen. For example, the pixels may be stored in the graphics memory 334 from top left to bottom right in row order. Thus, the top left hand pixel of the screen resides at the $800000 hex graphics memory location. The second pixel on the top line 1 is stored at $800001 hex, etc. The last pixel of the top line 1 is held at $8002D0 hex. The first pixel of the next line 2 is at the $8002D1 hex graphics memory location, etc. The bottom right hand corner of the screen corresponds to the $8545ff location of the graphics memory 334. Thus, the graphics memory arrangement corresponds to a rectangular X,Y-coordinate system on the TV screen, where 720 pixels in each line of the array are arranged in the horizontal direction X, and 480 pixels in each row of the array are arranged in the vertical direction Y.

The graphics accelerator 330 contains a color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

FIG. 3 illustrates some typical colors reproducible by the CLUT. For example, black color composed of red, green and blue bytes represented by $0 hex may correspond to the $0 hex location of the CLUT. White color composed of the $ff hex red, green and blue bytes may correspond to the $4 hex CLUT location, etc.

When the CLUT is programmed, the CPU 318 accesses the graphics memory 334 to write data values representing graphics. The graphics accelerator 330 scans the graphics memory 334 at a rate of 13.5 MHz to read the graphics data. Each 8-bit pixel value is transferred to the CLUT that converts it into a 24-bit color value in RGB format. As discussed above, the converter 332 converts the RGB color value into YUV format, and passes a 24-bit digital YUV value to the digital encoder 322 that converts it into analog NTSC luminance and chrominance signals, for example, at a 13.5 MHz rate. The NTSC encoding procedure carried out by the encoder 322 is well known to those skilled in the art. The analog luminance and chrominance signals via the TV modulator 338 are supplied to the TV set.

Figure 4:
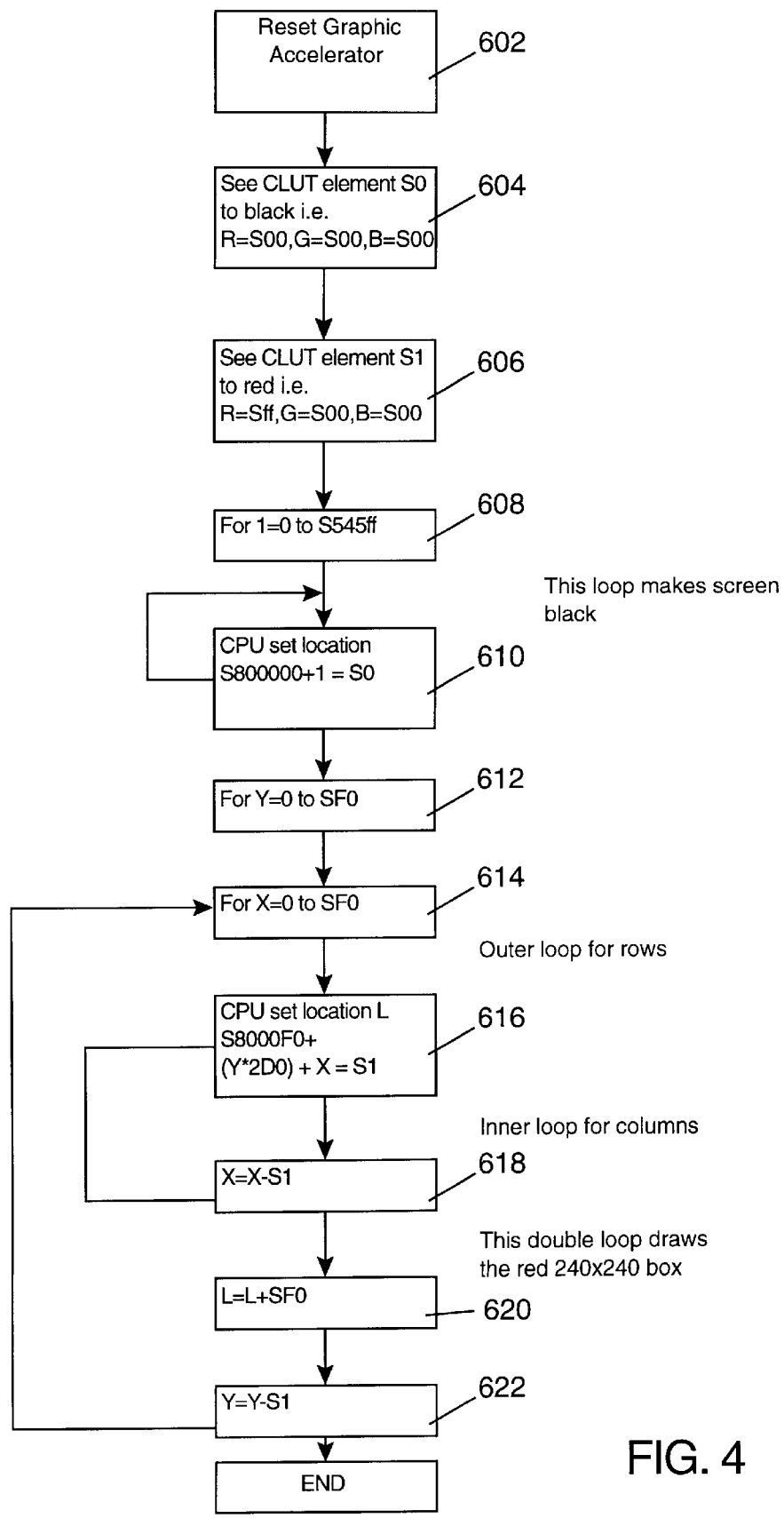
FIG. 4 is a flow chart illustrating an example of interactions between a CPU and graphics accelerator.

FIG. 4 shows a flow chart that illustrates an example of interactions between the CPU 318 and graphics accelerator 330 to draw a 240×240 pixel red square in the middle of a TV screen with a black background. In step 602, the CPU 318 resets the graphic accelerator 330. In step 604, the CPU 318 programs the CLUT in the graphics accelerator 330 so as to set CLUT location $0 hex to reproduce black color, i.e. red, green and blue bytes in this location are set to $0 hex. In step 606, the CPU 318 sets CLUT location $1 hex to reproduce red color, i.e. a red byte in this location is set to $ff hex, and green and blue bytes are set to $0 hex.

In steps 608 and 610, the CPU 318 carries out a loop to make the TV screen black. Locations $800000+I of the graphics memory 334 are set to $0 hex, for I that varies from $0 hex to $545ff hex.

In steps 612–622, the CPU 318 performs a double loop to draw the red 240×240 pixel box on the screen. The double loop comprises an outer loop carried out to set pixels in rows (Y-direction on the screen) of the graphics memory 334 to $1 hex to reproduce them in red color, and an inner loop to set pixels in lines (X-direction) of the graphics memory 334 to $1 hex to reproduce them in red color.

Figure 5:
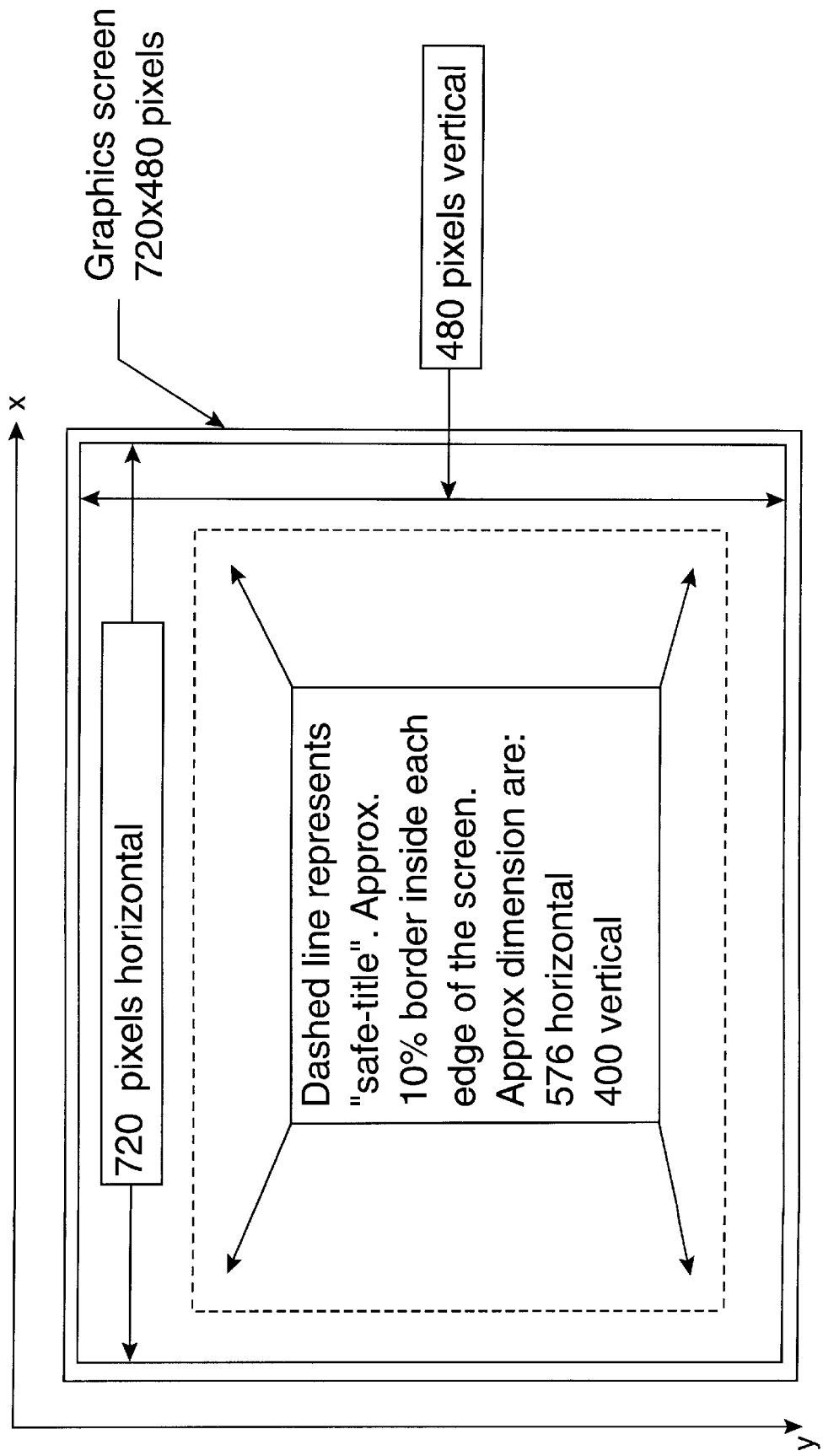
FIG. 5 is a diagram illustrating arrangement of pixels on a TV screen.

Graphical objects displayed on the TV screen are represented by a 2-dimensional array of pixels. For example, as shown in FIG. 5, the TV screen may be represented by a 720×480 array of pixels corresponding to a graphics plane stored in the graphics memory 334. 720 pixels may be arranged on the screen in the horizontal direction X, whereas 480 pixels may be arranged in the vertical direction Y. To perform graphics drawing operations, the CPU 318 may use an X, Y-coordinate system shown in FIG. 5, wherein coordinates X=0, Y=0 represent the top left hand corner of the TV screen, and coordinates X=720, Y=480 represent the bottom right hand corner of the screen.

It should be noted that due to "overscan" conditions, a television receiver may produce a raster on its screen so that pixels in the horizontal and vertical directions may not be entirely in the view of the user. Therefore, TV broadcast systems prevent images from being displayed outside of a "safe title" area located within approximately a 10% border all around the edge of the screen. As shown in FIG. 5, the safe title area contains approximately 576 pixels in the horizontal direction, and 400 pixels in the vertical direction. With such a scheme, the top left hand corner of the safe title area is located at position X=72, Y=40. The bottom right hand corner of the safe title area has coordinates X=648, Y=440. On the discussed below diagrams that illustrate the functional modes of the GUI, an outer solid-lined box represents the edge of the TV screen, and a dash line shows the border of the safe title area. The graphical objects displayed in various GUI modes are drawn in accordance with the graphical object drawing procedure discussed above in connection with FIGS. 2–4.

Figure 6:
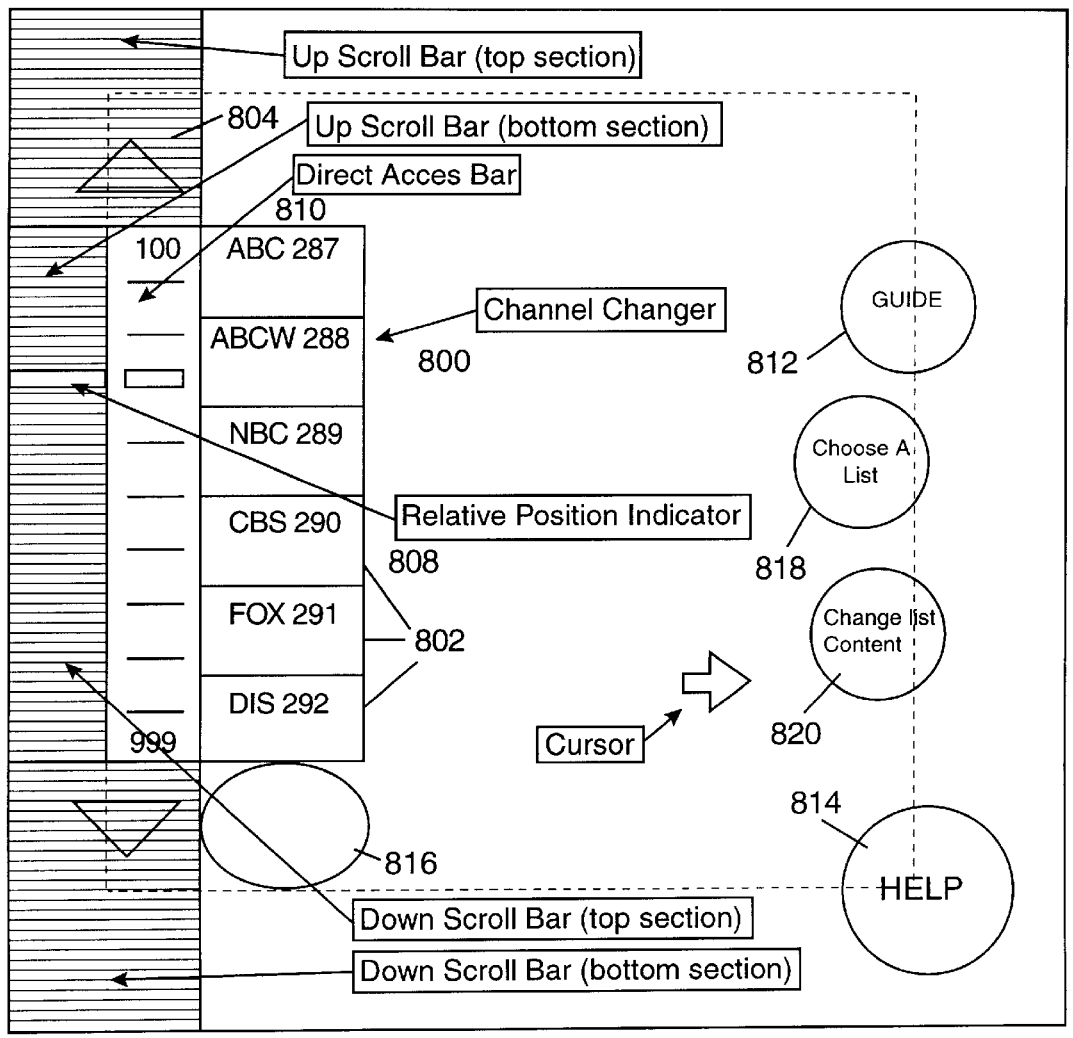
FIG. 6 is a diagram illustrating the TV GUI in a channel changer mode.

Reference is now made to FIG. 6 showing the TV GUI of the present invention in a channel changer mode that enables users to select a required TV channel among about 1000 channels provided by the satellite receiver. A TV set coupled to the satellite receiver 300 displays a graphical channel changer 800 having a vertical channel bar that includes graphical channel boxes 802 representing TV channels available in the satellite receiver 300. For example, each box 802 may contain the channel number and logo of a TV channel. In a digital satellite TV system, the channel bar may represent about 1,000 TV channels. A restricted number of the boxes 802 may be displayed on the TV screen at any given time. For example, FIG. 6 shows that six boxes 802 representing channels 287–292 are simultaneously displayed. The vertical channel bar may be represented by 120×300 pixels. For example, its top left corner may have coordinates X=122, Y=90, and its bottom right corner may be arranged at X=242, Y=390.

Up and down scroll bars 804 and 806 may be arranged near the channel bar to allow a user to move up and down through the entire list of TV channels. For example, the scroll bars 804 and 806 shown in FIG. 6 represent channels 100 through 999. A single click of the pointing device button causes the channel changer 800 to move up or down by one channel with respect to the TV channels currently represented in the channel boxes 802. For example, when the user clicks on the up scroll bar 804, the boxes 802 will shift from channels 287–292 to channels 286–291. A single click on the down scroll bar 806 will cause the boxes 802 to move from channels 287–292 to channels 288–293. Holding down the pointing device button may cause the list of TV channels to scroll continuously. A relative position indicator 808 shows the position of the TV channels currently displayed in the channel boxes with respect to other TV channels.

To switch the TV set to a required TV channel, the user directs the pointing device at the graphical channel box 802 that contains the number and logo of the required channel. The movement of the pointing device held in the user's hand causes the cursor to move to the required graphical channel box 802. The coordinates of the pointing device may be supplied to the microcontroller 344 on a periodic basis, for example, 60 times a second. The CPU 318 generates X, Y coordinates corresponding to a path for moving the cursor in alignment with pointing device movement. Cursor movement is achieved by multiple erasures and redraws of the cursor image performed on the path to the selected position. When the required cursor position is reached, the user may press a select button on the pointing device to tune to the required channel. In response to the user command, the CPU 318 sends a tune command to the RF tuner 302 to tune the satellite receiver 300 to the required TV channel.

It may be difficult to find a required channel among 1,000 channels provided by satellite TV, when the user does not know the number of the required channel. A direct access channel bar 810 presented next to the channel bar has a graduated scale representing available TV channels. The numbers of the first and last channels are respectively placed on the top and bottom of the scale. For example, the channel bar 810 has numbers 100 and 999 on its top and bottom indicating that TV channels 100 through 999 are represented. When a user points the pointing device at a selected region of the channel bar 810, the channel boxes 802 display numbers and logos of TV channels represented by that selected region. Operations of the direct access channel bar 810 are disclosed in more detail in our copending application Ser. No. 08/747,694, entitled "TELEVISION GRAPHICAL USER INTERFACE HAVING CHANNEL CONTROL BARS," filed concurrently herewith and incorporated by reference. Each component of the graphical channel changer may be displayed using the above-discussed procedure of drawing color graphic objects on a TV screen.

When the user directs the remote pointing device at a graphical button GUIDE 812, the TV GUI switches into a program guide mode to show TV programming carried by channels included in the currently selected channel list. A graphical button HELP 814 causes the TV GUI to switch into a help mode to assist the user in navigating through graphical options.

The graphical channel changer 800 allows the user to include any combination of TV channels into a channel list to be displayed. An oval list name object 816 may be arranged below the channel bar to indicate the name of the currently selected list of TV channels represented by the channel changer 800, and to enable the user to change the list. For example, the currently selected list may include all the channels provided by the satellite TV system. Alternatively, "everyday", "favorite" or "theme" channel list may be selected. The everyday list may include TV channels that the user wants to watch regularly. The favorite list may combine favorite TV channels. The theme list may contain TV channels relating to a specific theme, for example, sport or movie channels. Graphical button Choose A List 818 allows the user to select one of several available lists of TV channels. A graphical button Change List Content 820 enables the user to change the contents of an existing list or to create a new customized list. When the cursor is moved over any of the graphical buttons, they change their color to show to the user that the corresponding button is active and if clicked on will cause the system to perform the required task.

When the user clicks on the Change List Content button 820, the TV GUI switches to a change list content mode that enables the user to create a customized list of TV channels, and add or remove TV channels to or from an existing list of TV channels. The change list content mode is disclosed in more detail in our copending application Ser. No. 08/774,816, entitled "TELEVISION GRAPHICAL USER INTERFACE PROVIDING CUSTOMIZED LISTS OF PROGRAMMING," filed concurrently herewith and incorporated by reference.

As mentioned above, the oval list name indicator 816 enables the user to change the currently selected list of TV channels. When the pointing device held in the user's hand causes the cursor to move towards the list name indicator 816 (FIG. 7), the CPU 318 samples the cursor positions to generate X, Y coordinates corresponding to a path for moving the cursor in alignment with the pointing device movement. When the CPU 318 determines that the cursor is inside the area of the oval list name object 816, the color of the list name object 816 changes to indicate that the object is active. When the select button on the pointing device is pressed, the CPU 318 initiates switching to another list of TV channels created by the user in the change list content mode.

Figure 7:
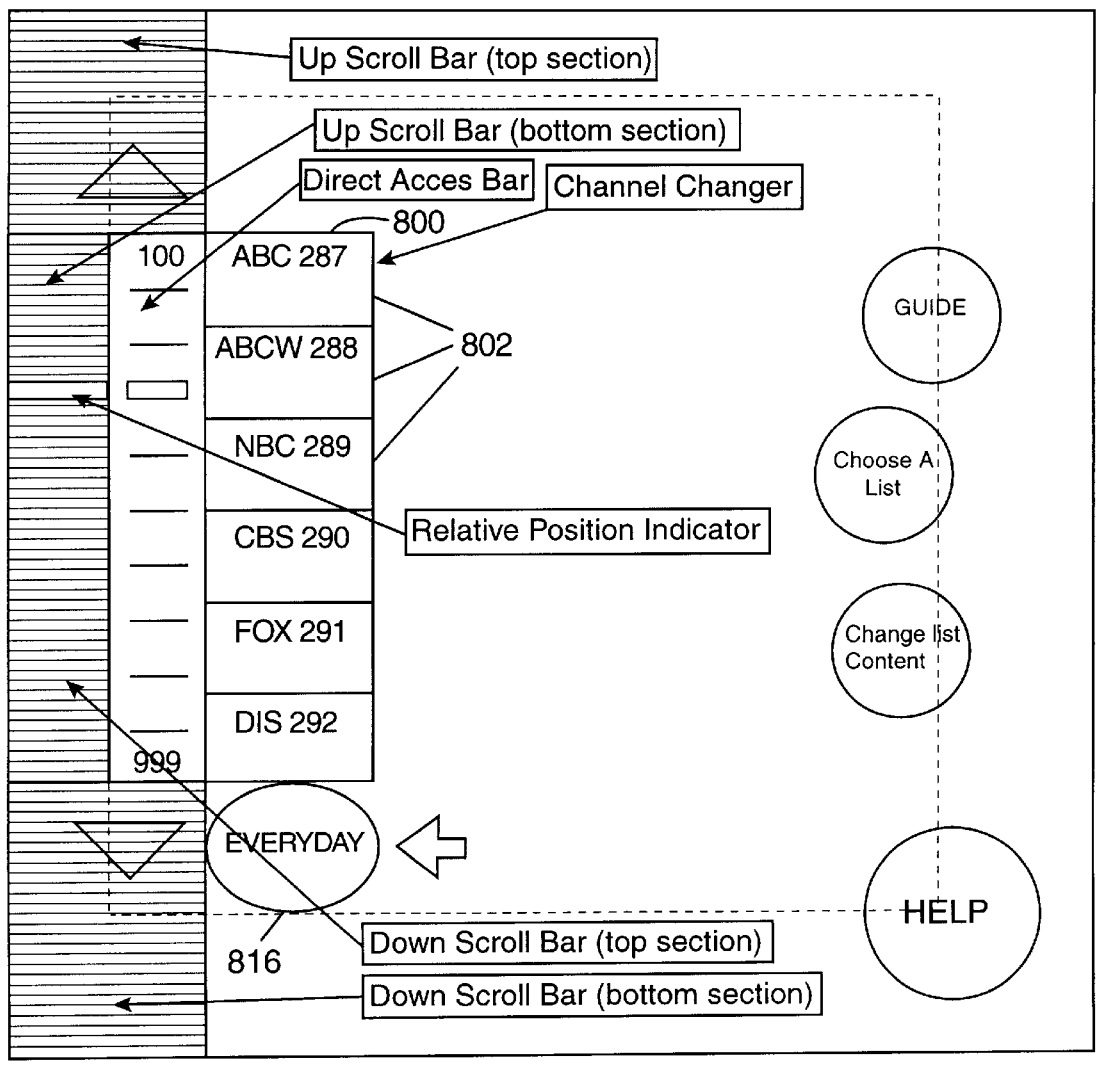
FIGS. 7 and 8 are diagrams that illustrate switching from an everyday list of TV channels to a favorite list of TV channels.
Figure 8:
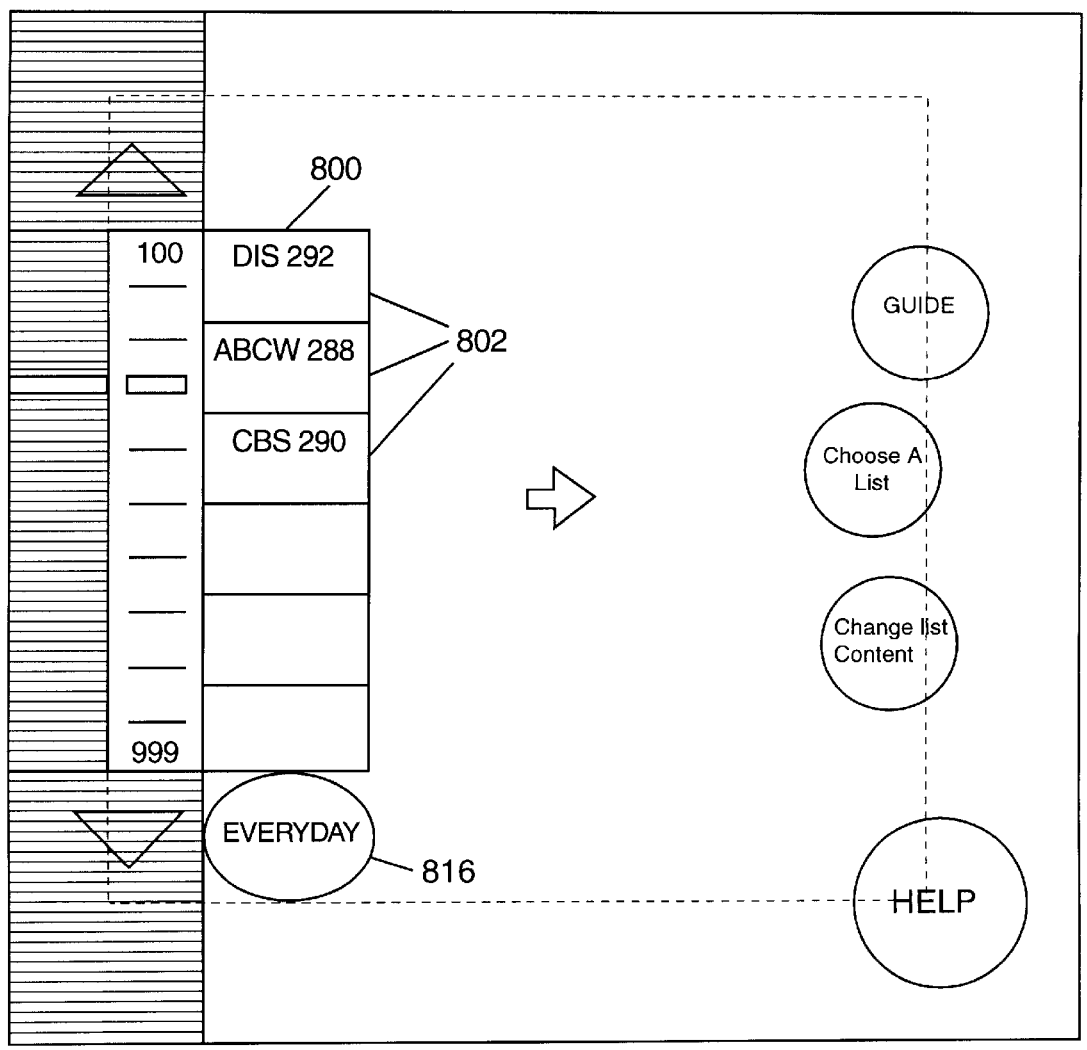

For example, when the oval list name object 816 in FIG. 7 shows that the currently selected list of TV programs is the everyday list, a single click on the object 816 may cause switching to the favorite list. As shown in FIG. 8, once the user clicks on the "EVERYDAY" list name object 816, the channel boxes 802 are redrawn to display the numbers and logos of TV channels from the favorite list. The oval list name object 816 is redrawn to replace the label "EVERYDAY" with the word "FAVORITE" to indicate that the favorite list of TV channels is selected.

Another click on the oval list name object 816 may cause the GUI to switch to the theme list of TV channels to include into the channel changer 800, for example, only movie channels. The oval list 816 may be redrawn to display the word "THEME" indicating that the theme list is selected.

The order, in which various TV channel lists follow each other, may be defined in the ROM 324, SRAM 326, or EEPROM 328. For example, once the user clicks on the "EVERYDAY" list name object 816, the GUI may switch to the favorite list of TV channels. The next click on the object 816 may cause switching to the theme list of TV channels. If the user clicks on the object 816 again, the GUI may return to the everyday list of TV channels.

To indicate to the user which TV channel list is selected, the color of the channel changer 800 and the oval list name object 816 changes when the GUI switches from one TV channel list to another.

As discussed above, the graphics accelerator 330 contains the color look up table (CLUT) that converts 256 elements representing 8-bit pixel values stored in the graphics memory 334 into 24-bit values composed of red (R), green (G), and blue (B) bytes corresponding to R, G, and B components of a picture in RGB format. The CLUT may be programmed by the CPU 318 to reproduce any color possible in a 24-bit color space.

For example, in FIG. 7, the channel boxes 802 and the oval list name object 816 that represent the everyday list of TV channels may be colored in blue. In FIG. 8, the channel boxes 802 and the oval list name object 816 that represent the everyday list of TV channels may be displayed in brown. When the theme list of TV channels is selected, the channel boxes 802 and the oval list name object 816 may be colored in purple.

Figure 9:
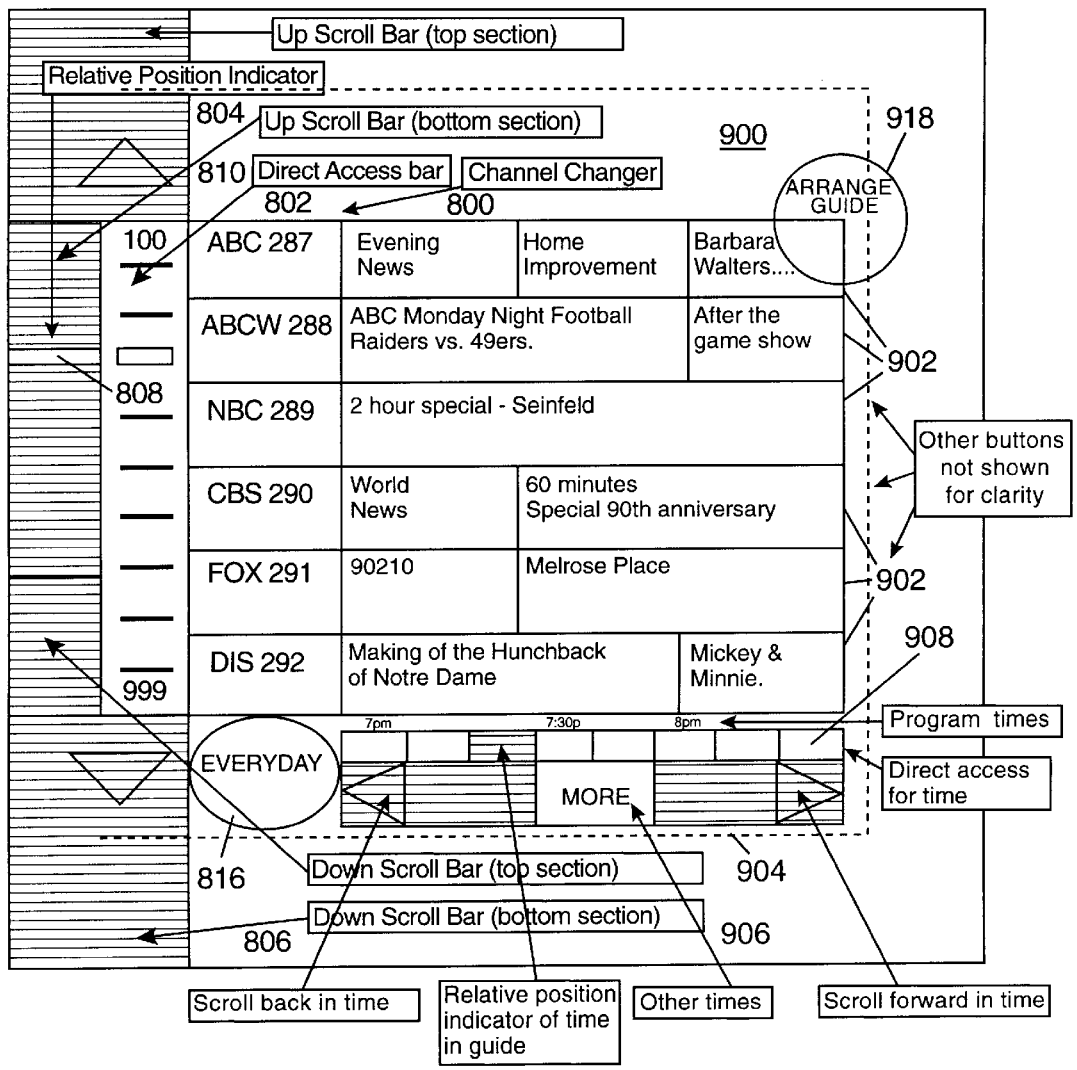
FIG. 9 is a diagram illustrating the TV GUI in a program guide mode.

Reference is now made to FIG. 9 illustrating the GUI of the present invention in a program guide mode that enables users to view TV programming information for TV channels of various TV channel lists. In this mode, the TV GUI of the present invention displays an electronic program guide 900 based on the graphical channel changer 800. This arrangement allows users to review TV programming information, and then, to select a TV channel that carries a desired TV program by directing the remote pointing device at the channel box 802 for the selected TV channel.

In addition to the channel changer 800, the program guide 900 comprises horizontal program bars 902 that indicate TV programs carried by TV channels during a predetermined time period. For example, ninety minutes of programming may be shown. Each horizontal program bar 902 is aligned with the channel box 802 representing the TV channel that carries the TV programs indicated in that program bar 902. Below the horizontal bars 902 are time legends that indicate the time of the TV programs represented by the horizontal bars 902. For example, the electronic program guide 900 shown in FIG. 9 contains TV programming from 7 p.m. to 8.30 pm.

A horizontal time scroll bar 904 may be arranged below the time legends to enable the user to look at a TV program schedule before and after the time indicated by the time legends. A graphical button MORE 906 allows the user to select any time period for which a TV program schedule is required. A direct access time bar 908 similar to the direct access channel bar 810 enables the user to access a TV program schedule for a selected region of the time bar 908 by directing the pointing device at the selected region.

Further, the TV GUI operating in the program guide mode may maintain the up and down channel scroll bars 804 and 806, and the direct access channel bar 810. Thus, the program guide 900 is formed out of the channel changer 800 when the TV GUI switches from the channel changer mode into the program guide mode. For example, the user may click on the guide button 812 to display the program guide 900. No redrawing of the vertical channel bar is performed. The two-dimensional program/time grid appears instantaneously aligned with the graphics for the channel changer. This allows the user to quickly and seamlessly go from the channel selector mode to the program guide mode, and thereafter, select a TV channel that carries a desired TV program by directing the remote pointing device at the channel box 802 for the selected TV channel. Switching the GUI into the program guide mode is disclosed in more detail in our copending application Ser. No. 08/720,500, entitled "TELEVISION GRAPHICAL USER INTERFACE THAT COMBINES ELECTRONIC PROGRAM GUIDE WITH GRAPHICAL CHANNEL CHANGER," filed concurrently herewith and incorporated by reference.

The horizontal program bars 902 in the program guide 900 represent programs carried by TV channels of the currently selected TV channel list. The oval list name object 816 is maintained in the program guide mode to show the name of the currently selected TV channel list. For example, the label "EVERYDAY" in the list name object 816 in FIG. 9 indicates that a program guide for the everyday list of TV channels is currently displayed.

In the program guide mode, the user may click on the oval list name object 816 to switch to a program guide for another list of TV channels. For example, a single click on the "EVERYDAY" list name object 816 may cause switching to a program guide for the favorite list of TV channels. The next click may cause transfer to a program guide for the theme list of TV channels, etc.

To identify various lists of TV channels in the program guide mode, the horizontal program bars 902, together with the channel boxes 802 and the oval list name object 816, may be presented in a color that represents a particular list of TV channels. For example, in FIG. 9, the program bars 902, the channel boxes 802, and the list name object 816 that represent the everyday list of TV channels may be colored in blue. For the favorite list of TV channels, the program bars 902, the channel boxes 802, and the list name object 816 may be presented in brown. The theme list of TV channels may be represented by the program guide elements colored in purple.

There accordingly has been described a TV graphical user interface (GUI) in a satellite TV system that provides about 1000 TV channels. The TV GUI enables users to create customized lists of TV channels. Everyday, favorite and theme lists may be generated to respectively combine TV channels being watched regularly, favorite TV channels and channels relating to particular subjects. An oval list name object is arranged on a screen to indicate the name of the currently selected list of TV channels. The users may click on the list name object to make their selection among various TV channel lists available in the TV system. In a channel changer mode, the TV GUI displays a graphical channel changer composed of channel boxes that show numbers and logos of TV channels in the currently selected list. To switch the TV set to a required TV channel, the user clicks on the graphical channel box that indicates the required channel. In a program guide mode, a list of TV programs may be provided based on the channel changer. Vertical program bars that display TV programs are aligned with the channel boxes indicating TV channels that carry the corresponding TV programs. To identify various TV channel lists available in the TV system, the oval list name object, as well as the channel boxes and program bars, are displayed in a color that represents a selected TV channel list.

In this disclosure, there are shown and described only the preferred embodiments of the invention, but it is to be understood that the invention is capable of changes and modifications within the scope of the inventive concept as expressed herein.

What is claimed is:

1. A television (TV) system comprising:
   a CPU, and
   a TV monitor controlled by said CPU for displaying a graphical channel changer having channel objects for representing TV channels of a first TV channel list selected among a plurality of TV channel lists preprogrammed by a user,
   wherein said CPU is configured to arrange a list name object on a screen of the TV monitor to switch said channel changer from said first TV channel list to a second TV channel list when the user activates a pointing device directed at said list name object, and said list name object is dynamic and shows a name of the TV channel list currently represented by said channel changer.

2. The system of claim 1, wherein said list name object is identified by a first color when said channel changer represents said first TV channel list, and by a second color when said channel changer represents said second TV channel list.

3. The system of claim 2, wherein said channel objects are identified by said first color when said channel changer represents said first TV channel list, and by said second color when said channel changer represents said second TV channel list.

4. The system of claim 3, wherein said TV monitor further displays an electronic TV program guide that contains a first TV program schedule for a predetermined time period for TV channels of the first TV channel list.

5. The system of claim 4, wherein said electronic program guide switches from the first TV program schedule for the first TV channel list to a second TV program schedule for the second TV channel list when the user activates a pointing device directed at said list name object.

6. The system of claim 5, wherein said electronic TV program guide comprises program bars for indicating TV programs carried by TV channels of a currently selected TV channel list.

7. The system of claim 6, wherein said program bars are identified by said first color when said program guide represents said first TV program schedule, and by said second color when said program guide represents said second TV program schedule.

8. The system of claim 7, wherein said program bars are aligned with said channel objects.

9. The system of claim 8, wherein said channel changer switches from the second TV channel list to a third TV channel list when the user activates the pointing device directed at said list name object representing the second TV channel list.

10. The system of claim 9, wherein said electronic program guide switches from the second TV program schedule for the second TV channel list to a third TV program schedule for the third TV channel list when the user activates the pointing device directed at said list name object representing the second TV channel list.

11. The system of claim 10, wherein said list name object is identified by a third color when said channel changer represents said third TV channel list.

12. The system of claim 11, wherein said channel objects are identified by said third color when said channel changer represents said third TV channel list.

13. The system of claim 6, wherein said vertical program bars are identified by said third color when said program guide represents said third TV program schedule.

14. In a graphical user interface displayed on a TV monitor and having channel objects for indicating TV channels, and a list name object for identifying a first list of the TV channels currently selected by a user, a method of selecting customized lists of TV channels comprising the steps of:
   checking a position of a cursor moved by a pointing device,
   detecting when the cursor is positioned over the list name object,
   redrawing the channel objects to indicate a second list of TV channels when the pointing device is activated,
   displaying a name of the selected list of TV channels on said list name object in a dynamic fashion.

15. The method of claim 14, further comprising the step of redrawing the channel objects to indicate a third list of TV channels when the pointing device is activated again.

16. The method of claim 15, wherein the list name object is identified by a first color when the first list is selected, by a second color when the second list is selected, and by a third color when the third list is selected.

17. The method of claim 16, wherein the channel objects are identified by the first color when the first list is selected, by the second color when the second list is selected, and by the third color when the third list is selected.

18. A TV system comprising:
   a CPU and
   a monitor controlled by the CPU for displaying lists of TV channels, and a TV channel list name indicator for enabling a user to switch from a first list of TV channels to a second list of TV channels when a pointing device directed at said TV channel list name indicator is activated once, and for enabling the user to switch from the first list of TV channels to a third list of TV channels when the pointing device directed at said TV channel list name indicator is activated twice,
   whereby said list name indicator dynamically displays a name of the list of TV channels.

19. The TV system of claim 18, wherein the displayed lists of TV channels are identified by a first color, when the first list is selected, by a second color when the second list is selected, and by a third color when the third list is selected.

* * * * *